United States Patent [19]

Bianchetti et al.

US005677271A

[11] Patent Number: 5,677,271
[45] Date of Patent: Oct. 14, 1997

[54] LIMESCALE REMOVAL COMPOSITIONS

[75] Inventors: Giulia Ottavia Bianchetti; Sergio Cardola; Stefano Scialla, all of Rome, Italy

[73] Assignee: The Procter & Gamble Company, Cincinnati, Ohio

[21] Appl. No.: 640,967

[22] PCT Filed: Nov. 28, 1994

[86] PCT No.: PCT/US94/13713

§ 371 Date: May 10, 1996

§ 102(e) Date: May 10, 1996

[87] PCT Pub. No.: WO95/14641

PCT Pub. Date: Jun. 1, 1995

[30] Foreign Application Priority Data

Nov. 29, 1993 [EP] European Pat. Off. ............ 93870228

[51] Int. Cl.$^6$ .................. C02F 5/00; C02F 5/08; C02F 5/02
[52] U.S. Cl. ................................................. 510/253
[58] Field of Search ................... 252/82, 87; 510/253

[56] References Cited

U.S. PATENT DOCUMENTS

| | | | |
|---|---|---|---|
| 3,440,095 | 4/1969 | Larsonneur | 510/253 |
| 3,734,954 | 5/1973 | Maier | 510/253 |
| 3,794,523 | 2/1974 | Thompson | 510/253 |
| 3,873,362 | 3/1975 | Mihran et al. | 510/253 |
| 4,581,161 | 4/1986 | Nedonchelle | 252/550 |
| 4,759,867 | 7/1988 | Choy et al. | 252/143 |
| 4,895,669 | 1/1990 | Choy et al. | 252/95 |
| 4,957,653 | 9/1990 | Cordani | 156/656 |
| 4,975,216 | 12/1990 | Schluessler | 134/4 |
| 5,039,441 | 8/1991 | Thomas et al. | 252/142 |
| 5,087,376 | 2/1992 | Bendiksen et al. | 210/700 |
| 5,183,573 | 2/1993 | Kreh et al. | 510/253 |
| 5,254,290 | 10/1993 | Blandiaux et al. | 252/545 |
| 5,431,839 | 7/1995 | Guillou | 510/253 |
| 5,451,335 | 9/1995 | Hieatt et al. | 510/253 |

*Primary Examiner*—Margaret Medley
*Attorney, Agent, or Firm*—Thomas G. Krivulka; T. David Reed

[57] ABSTRACT

Limescale removing compositions are disclosed which comprises a C1–C6 linear or branched alkyl sulfonic acid or mixtures thereof. Said alkyl sulfonic acids are particularly efficient in removing limescale and they are furthermore stable to bleach/oxidants. Therefore, compositions can be formulated which further comprise acid-stable oxidant compounds. Also, mixtures of alkyl sulfonic acids and sulfamic acid are particularly effective in removing limescale. The compositions of the invention are used to remove limescale from a variety of surfaces.

7 Claims, No Drawings

LIMESCALE REMOVAL COMPOSITIONS

TECHNICAL FIELD

The present invention relates to compositions for the removal of limescale. The compositions herein can be used on a variety of surfaces, ranging from bathrooms and kitchen surfaces to various appliances. The compositions herein can further be used to remove limescale from dentures.

BACKGROUND

Tap water always contains a certain amount of solubilized ions which eventually deposit as salts, on surfaces in contact with said water, as it evaporates. Such salts include calcium carbonate, commonly referred to as limescale. This phenomenon of limescale accumulation on surfaces which are often in contact with water may damage surfaces and affect the functioning of taps or appliances. Also, the accumulation of limescale in the toilet bowls is aesthetically unpleasant and favors the deposition of further soil and the growth of microorganisms. It is therefore important to control this limescale accumulation phenomenon.

A variety of compositions have been proposed for this purpose, which typically comprise various acids, such as hydrochloric acid. However, compositions of the art formulated with said acids require a significant amount of acid to ensure effective removal of limescale, and are thus potentially harmful to the user in case of contact with the skin, or accidental ingestion. It is thus an object of the present invention to provide limescale removing compositions which are particularly efficient in removing limescale, yet which have a lower reserve of acidity than the compositions of the art, thus which are less harmful.

It is also desirable to formulate compositions which comprise bleaches. Indeed, bleaches possess many desirable properties, including disinfection properties. Furthermore, such compounds as monopersulfuric acid are particularly effective as disinfectants and in removing and or decolouring stains for household cleaning applications (copending European patent application EP 93870198.4). However, bleaches in general raise compatibility issues in relation with the acids used to remove limescale. In particular, persulfuric acid is not compatible with the acids used in the art to remove limescale because persulfuric acid oxidizes the limescale removing acid upon storage, resulting in a dramatic loss of available oxygen. And by the time the product reaches the consumer, most of the available oxygen is lost. Typical acids used in the art for removing limescale, namely maleic, citric, hydrochloric and sulfamic acid are all oxidized by persulfuric acid in particular. It is thus an object of the present invention to provide a limescale removing composition which can be formulated with bleaches, in particular persulfuric acid, in a stable manner.

In response to these objects, we have now found that such a limescale removing composition could be formulated which comprises, as the acid, a C1–C6 linear or branched alkylsulfonic acid, or mixtures thereof.

SUMMARY OF THE INVENTION

The present invention thus encompasses a composition suitable for removing limescale, which comprises from 1% to 50% by weight of the total composition of a C1–C6 linear or branched alkylsulfonic acid, or mixtures thereof. In one embodiment of the invention, the compositions of the present invention preferably comprise an acid-stable bleach compound. In another embodiment of the invention, the compositions herein additionally comprise a small amount of sulfamic acid. In its broadest embodiment, the present invention further encompasses the use of aqueous compositions comprising a C1–C6 linear or branched alkylsulfonic acid, or mixtures thereof, for removing limescale.

DETAILED DESCRIPTION OF THE INVENTION

The compositions of the present invention are aqueous liquid compositions comprising a C1–C6 linear or branched alkylsulfonic acid, or mixtures thereof. Particularly preferred for its limescale removal performance is the use herein of methanesulfonic acid which is commercially available for example from Aldrich, William Blythe & Co. Ltd. or Elf Atochem. The compositions herein comprise from 1% to 50% by eight of the total composition of said acid or mixtures thereof, preferably from 1% to 30%, most preferably 1% to 20%. The compositions according to the present invention are less has than the compositions of the art in that at parity limescale removal performance the reserve of acidity is much less than the compositions in the art. Thus in this respect, in case of contact with the user's skin or in case of ingestion, the compositions of the present invention will be less harmful.

The pH of the compositions according to the present invention may range from 0 to 4, preferably 0 to 2, and is essentially determined by the type and amount of acid used.

In one embodiment of the present invention, the compositions herein may comprise an acid-stable bleach i.e., an oxidant compound. By acid-stable, it is meant herein a compound which is stable in the acidic environment of the compositions herein. This criterion is to be assessed on a case by case basis, depending on the specifics of given formulations. It is essential that the bleach/oxidant chosen be stable at the pH of the formulation being considered. By stable, it is meant herein that the oxidant should preferably not undergo more than 30% loss of available oxygen in 6 months at room temperature (25° C.). A wide variety of oxidants have been described in the art which are suitable for use herein. Suitable acid-stable oxidant compounds for use herein include inorganic and organic peroxides. Examples of inorganic peroxides are: hydrogen peroxide and sources thereof (e.g., perborate, percarbonate), persulfate salts (i.e., dipersulfate and monopersulfate salts), persulfuric acid and mixtures thereof. Examples of organic peroxides are: benzoyl peroxide, organic percarboxylic acids (i.e., peracetic acid) and mixtures thereof. Percarboxylic acids and, in general, organic or inorganic peroxides can be either solubilized in the formula or dispersed in the form of suspended solids or emulsified liquids. Particularly preferred for use herein are hydrogen peroxide or sources thereof, and persulfuric acid or salts thereof because of their excellent stain removal performance and stability in acidic matrices, and mixtures thereof.

Preferred salts of persulfuric acid for use herein are monopersulfate salts, commercially available as Curox® from Interox. The compositions herein may comprise from 0.1% to 50% by weight of the total compositions of said acid-stable bleach/oxidant compound or mixtures thereof, preferably from 1% to 30%, most preferably 1% to 20%.

In another embodiment of the present invention, the compositions herein may comprise a small amount of sulfamic acid. Indeed, we have found that the combination of the alkylsulfonic acids herein together with sulfamic acid act in synergy in removing limescale. This property is particularly interesting as it allows the formulation of compositions which are particularly effective in removing limescale, while they comprise only minor amounts of sulfamic acid, thereby reducing harshness. Accordingly, the compositions herein may comprise from 0.1% to 25% by weight of the total composition of sulfamic acid, preferably from 0.1% to 20%, most preferably from 0.2% to 15%. The synergistic effect observed depends to some extent on the ratio of sulfamic acid to alkylsulfonic acid. Preferably, the ratio of sulfamic acid to alkylsulfonic acid should be of from 1:6 to 1:3. In this embodiment where sulfamic acid is incorporated in the compositions herein, it is preferred to formulate the compositions without monopersulfuric acid and similar oxidants, since monopersulfuric acid oxidizes sulfamic acid, thereby resulting in loss of available oxygen.

The compositions herein may further comprise surfactants since they are often used on items or surfaces which have soils or stains which do not comprise limescale, and which require the presence of surfactants in the compositions of the present invention, in order to be removed from said surfaces. Thus the compositions according to the present invention can comprise any surfactant, cationic, anionic, nonionic and zwitterionic, in amounts ranging up to 50% by weight of the total composition, preferably from 1% to 30%. Suitable anionic surfactants include alkyl or alkylene sulfates or sulfonates, alkyl or alkylene ether sulfates or sulfonates, linear alkyl benzene sulfonate and the like. Suitable cationic surfactants include quaternary ammonium salts. Suitable nonionic surfactants for use herein include ethoxylated carboxylic acids and fatty alcohol ethoxylates. For example, when the compositions herein are formulated so as to be used on inclined surfaces, it may be desirable to formulate them as emulsions of nonionic surfactants, such as in copending European patent application 9387009.1. Indeed, appropriate selection of the nonionic surfactants allows to obtain compositions with pseudoplastic profile which leads to excellent spreading and clinging characteristics.

The present invention can further comprise a multitude of optionals such as solvents, colorants, dyes, perfumes, stabilizers and the like.

EXAMPLES

The following compositions are made which comprise the following ingredients in the following proportions (total weight %)

| Example 1 | |
|---|---|
| Dobanol @ 91–10 | 2.1 |
| Dobanol @ 91–2.5 | 4.9 |
| Methanesulfonic acid | 5 |
| Curox @ | 6 |
| Cyclohexane | 0.5 |
| water and minors (e.g., dye, perfume) up to 100% | |
| pH = 0.5 | |

| Example 2 | |
|---|---|
| Dobanol @ 91–10 | 1.8 |
| Dobanol @ 91–2.5 | 4.2 |
| Methanesulfonic acid | 10 |
| water and minors (e.g., dye, perfume) up to 100% | |
| pH = 0.3 | |

| Example 3 | |
|---|---|
| Dobanol @ 23–2 | 6 |
| Dobanol @ 45–7 | 6 |
| Dobanol @ 91–10 | 3 |
| Methanesulfonic acid | 5 |
| Hydrogen peroxide | 9 |
| water and minors (e.g., perfume, dye) up to 100% | |
| pH = 0.5 | |

| Example 4 | |
|---|---|
| Dobanol @ 91–10 | 2.1 |
| Dobanol @ 91–2.5 | 4.9 |
| Methanesulfonic acid | 5 |
| water and minors (e.g., perfume, dye) up to 100% | |
| pH = 0.5 | |

| Example 5 | |
|---|---|
| Methanesulfonic acid | 5 |
| water and minors (e.g., perfume, dye) up to 100% | |
| pH = 0.5 | |

| Example 6 | |
|---|---|
| Dobanol @ 91–10 | 1.8 |
| Dobanol @ 91–2.5 | 4.2 |
| Methanesulfonic acid | 5 |
| Curox @ | 3 |
| Hydrogen peroxide | 6 |
| water and minors (e.g., perfume, dye) up to 100% | |
| pH = 0.5 | |

| Example 7 | |
|---|---|
| Dobanol @ 91–10 | 1.8 |
| Dobanol @ 91–2.5 | 4.2 |
| Ethanesulfonic acid | 5 |
| Cyclohexane | 0.5 |
| water and minors (e.g., perfume, dye) up to 100% | |
| pH = 0.7 | |

| Example 8 | |
|---|---|
| Dobanol @ 91–10 | 1.8 |
| Dobanol @ 91–2.5 | 4.2 |
| 1-propanesulfonic acid | 10 |
| Cyclohexane | 0.5 |
| water and minors (e.g., perfume, dye) up to 100% | |
| pH = 1 | |

| Example 9 | |
|---|---|
| LAS | 10 |
| methanesulfonic acid | 5 |
| water and minors (e.g., perfume, dye) up to 100% | |
| pH = 0.5 | |

| Example 10 | |
|---|---|
| Dobanol @ 91–10 | 1.8 |
| Dobanol @ 91–2.5 | 4.2 |
| Methanesulfonic acid | 7.5 |
| Sulfamic acid | 2.5 |
| water and minors (e.g., perfume, dye) up to 100% | |
| pH = 0.3 | |

| Example 11 | |
|---|---|
| Dobanol @ 91–10 | 1.8 |
| Dobanol @ 91–2.5 | 4.2 |
| Methanesulfonic acid | 9 |
| Sulfamic acid | 1 |
| water and minors (e.g., perfume, dye) up to 100% | |
| pH = 0.2 | |

| Example 12 | |
|---|---|
| Dobanol @ 91–10 | 1.8 |
| Dobanol @ 91–2.5 | 4.2 |
| Methanesulfonic acid | 5 |
| Sulfamic acid | 5 |
| water and minors (e.g., perfume, dye) up to 100% | |
| pH = 0.4 | |

The limescale removal efficiency of samples is evaluated by putting a block of 6 g of calcium carbonate in 50 mls of the sample to be evaluated for a period of 30 minutes. The block is weighed dry before and after the experiment. We have measured that with composition 4, the weight decrease was 0.83 g and 1.1 g for composition 5. In the same composition, where methanesulfonic acid is replaced by the same weight quantity of sulfamic acid, the weight decrease is only 0.731 g. We have also measured that it takes 13% of hydrochloric acid in a product marketed under the trade name of WC Net @ to obtain a similar result (weight decrease 0.84 g) as with 5% methanesulfonic acid. Also, composition 10 illustrates that mixtures of alkylsulfonic acids with sulfamic acids are particularly effective in removing limescale. In the same experiment, we measured a weight decrease of 1.06 g with composition 10, while the same composition but with 10% methanesulfonic acid (composition 2) only, instead, gave 0.87 g decrease, and the same composition but with 10% sulfamic acid only, instead, gave 0.85 g decrease. Thus when combining the alkylsulfonic acids of the present invention with sulfamic acid, a better performance is obtained with a the same total amount of acid than with either of these acids alone. The synergistic effect of mixtures of sulfamic acid with alkylsulfonic acid, in this case methanesulfonic acid, is maximized at certain ratios. Composition 11 and 12, outside the preferred ratio range, give a weight decrease of respectively 0.90 g and 0.93 g. This performance is better than the performance obtained with either acids alone but poorer than the performance obtained with composition 10 comprising a mixture of beth acids within the preferred ratio range.

In terms of reserve of acidity, we have measured that it takes 1.88 g NaOH/100 g product to bring composition 1 to pH4, while it takes 16.80 g NaOH/100 g product to bring to pH 4 a composition marketed under the trade name WC Net @. Similarly, it takes 15.5 g NaOH/100 g product to bring to pH 4 a composition marketed under the trade name Harpic limescale Remover @. Thus composition 1 has much less reserve of acidity and is therefore less harmful to the user.

In terms of bleach stability, the available oxygen is monitored in composition 1. The available oxygen is measured in the fresh composition, and in the same composition after one week storage at room temperature (25° C.). We have measured there was no loss of available oxygen with composition 1 whereas in the same compositions where methanesulfonic acid was replaced respectively by the same amount (eight) of sulfamic or hydrochloric acid, the loss of available oxygen in the same period ranges between 66% and 98%. Thus the compositions according to the present invention are much more stable

What is claimed is:

1. An aqueous acidic composition suitable for removing limescale, said composition comprising from 1% to 50% by weight of the total composition of a C1–C6 linear or branched alkylsulfonic acid, or mixtures thereof and from 0.1% to 25% of sulfamic acid.

2. A composition according to claim 1 wherein said composition further comprises an acid-stable oxidant compound, or mixtures thereof.

3. A composition according to claim 2 wherein said oxidant is hydrogen peroxide or a salt of persulfuric acid.

4. A composition according to claim 1 which further comprises up to 50% by weight of the total composition of a surfactant.

5. A composition according to claim 1, 2, or 3, wherein said composition comprises from about 0.2% to about 15% by weight of the total composition of sulfamic acid.

6. A composition according to claim 5 wherein the ratio of sulfamic acid to alkylsulfonic acid is from about 1:3 to about 1:6.

7. A method of removing limescale deposits from surfaces by contacting said limescale with an aqueous composition which comprises from 1% to 50% $C_1$–$C_6$ linear or branched chain alkyl sulfonic acid and from 0.1 to 25% sulfamic acid.

* * * * *